Figure 1:
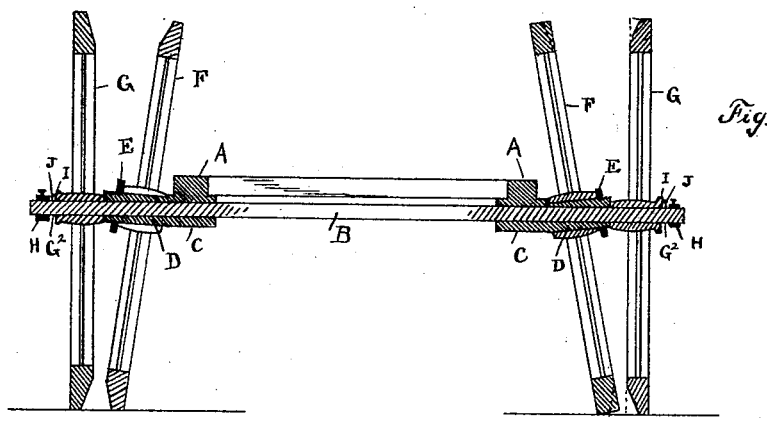

(No Model.)

R. BOYD.
CORN PLANTER.

No. 499,958. Patented June 20, 1893.

Witnesses
A. Keithley.
C. Johnson.

Inventor
Randolph Boyd
By L. M. Thurlow
Atty.

UNITED STATES PATENT OFFICE.

RANDOLPH BOYD, OF GALVA, ILLINOIS.

CORN-PLANTER.

SPECIFICATION forming part of Letters Patent No. 499,958, dated June 20, 1893.

Application filed October 19, 1892. Serial No. 449,413. (No model.)

*To all whom it may concern:*

Be it known that I, RANDOLPH BOYD, a citizen of the United States, residing at Galva, in the county of Henry and State of Illinois, have invented certain new and useful Improvements in Corn-Planters; and I do hereby declare the following to be a full, clear, and exact description of the invention, such as will enable others skilled in the art to which it appertains to make and use the same.

This invention relates to improvements in corn planters.

The object of the invention is to provide a planter with two pairs of wheels—that is, two wheels on either side of the machine; and the purpose of this construction is this:—that when a hill of seed has been planted, the wheels may press each side of the loose earth down and at the same time without packing the center of the row.

I am aware that there are machines in use which have two wheels at each side of the planter, but they are both perpendicular and therefore parallel with each other, and furthermore, have their bearings on one and the same axle, while the construction and method of mounting the wheels of my device are entirely different inasmuch as the inner wheels of either couple are not mounted on the axle proper, but on the boxing or part thereof and therefore being entirely independent of the axle, and furthermore, the wheels being mounted on the machine at an angle instead of parallel with each other, any obstruction being wedged between the wheels at the point of their contact with the ground is liberated as the wheels revolve, for the reason, that the rear portions of the rims or tires of the wheels are constantly moving away from each other as the machine moves forward. This construction also overcomes the difficulty of clogging of the wheels, which is one of the troubles with the perpendicular wheels mentioned.

Figure 2:
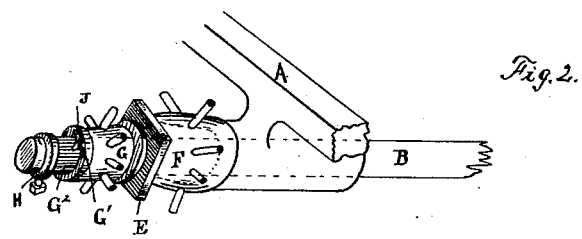
Figure 3:
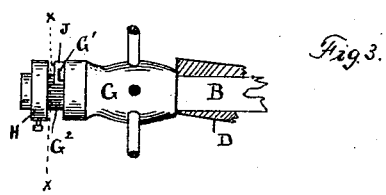
Figure 4:
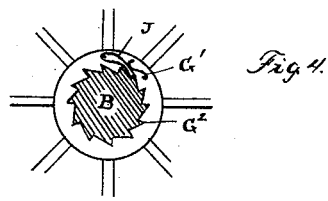
Figure 5:
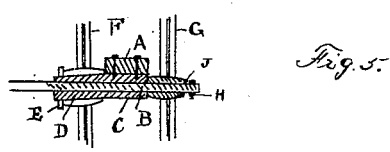

In the drawings forming a part of this application, Figure 1 represents a longitudinal section through the axle, wheels and a portion of the frame of the planter. Fig. 2 is a perspective view of a portion of the frame of a planter showing the axle mounted in the bearing and also showing the peculiar construction of parts. Fig. 3 shows side view of an outer wheel, axle and part of bearing and showing a pawl and ratchet construction. Fig. 4 is an end section of the axle through dotted line $x\ x$ Fig. 3. Fig. 5 shows a modification of Fig. 1.

A represents cross section of the frame of a planter which is mounted on the axle B by the bearing C. The said bearing or boxing C may be cast with the frame or bolted thereto and its outer extremity is formed into the upwardly inclined portion D forming an independent stationary axle for the inner wheel F. The outer end of the axle D is screw threaded and is provided with a nut or burr E serving to retain the wheel in its place, and the outer wheel G is loosely mounted on the axle B, and the hub of said wheel bears against the squared end of the said bearing D. The outer end of the hub of the wheel G is enlarged and to the enlarged end I is pivotally secured a pawl J actuated by a spring $G'$ engaging with the teeth $G^2$ on the axle B. On the axle B a ring H with a set screw is placed, which serves to retain the wheel G in its place. It will be seen that in this way the wheel F is mounted on its bearing, it revolves at an angle with the outer vertical wheel G and thus never becomes clogged with obstructions.

The inner edge of the rim of the outer wheel G may be beveled to more effectually accomplish its work as also may the outer rim of the wheel F. These wheels may be used however to advantage with the flat faced tire as in ordinary wheels.

Although machines of this character may be built to presumably accomplish the above purpose, they do not, but my machine is so constructed as to fully attain the object for which it is designed.

The purpose of the pawl and ratchet attachment is to allow the machine to turn round easily.

In Fig. 5 may be seen a modification of the construction shown in Fig. 1 and in it the wheel F and bearing D are placed inside the frame A, the wheel G still occupying its position outside.

I claim—

1. In a corn planter, the frame A having the boxings C C made integral with or bolted to the under side thereof, the upwardly extending bearing D made integral with the boxing C, and forming a bearing for the wheel F, said wheel occupying a position at an angle to the perpendicular wheel G, said wheel G being mounted on the axle B, and the axle B having bearings in the boxings C C substantially of the construction herein shown and all working together in the manner and for the purposes set forth and described.

2. In a corn planter, the boxings C with the upwardly extending bearing D made integral therewith, said bearing provided with a nut or burr E on the outer free end thereof for the purposes set forth, and said portions C and D forming bearing for the axle B substantially in the manner described and shown.

3. In a corn planter, the vertical wheel G mounted on the axle B and the wheel F mounted on the bearing D at an angle to the said vertical wheel G said wheels F and G having their rims or tires beveled on the inner sides thereof substantially in the manner and for the purposes herein described and shown.

4. In a corn planter, the frame A, having the boxings C C made integral therewith or bolted to the under side thereof, the upwardly inclined bearing D made integral with the boxing C and forming a bearing for the wheel F, said wheel occupying a position at an angle to the perpendicular wheel G, said wheel G being mounted on the axle B, the said frame A occupying a position between or on the inner side of the said wheels substantially in the manner and for the purposes set forth and described.

In testimony whereof I affix my signature in presence of two witnesses.

RANDOLPH BOYD.

Witnesses:
WESLEY D. PATTY,
J. H. BOYD.